Feb. 15, 1955  A. S. CAMPBELL ET AL  2,701,912
EXTRACTING MEASURING DEVICE
Filed Dec. 1, 1953
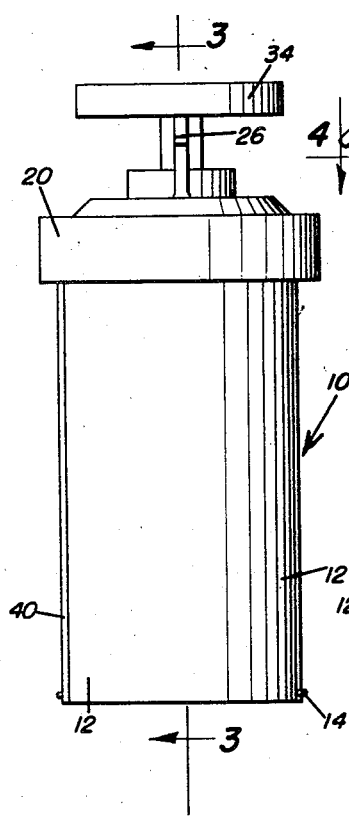
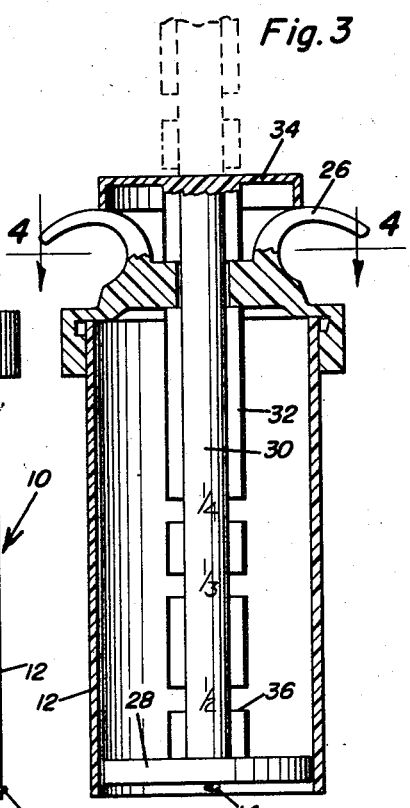
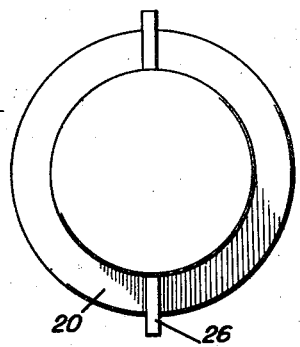
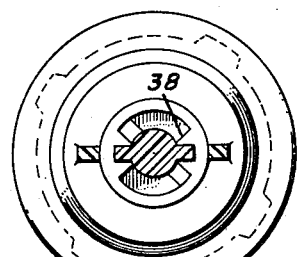
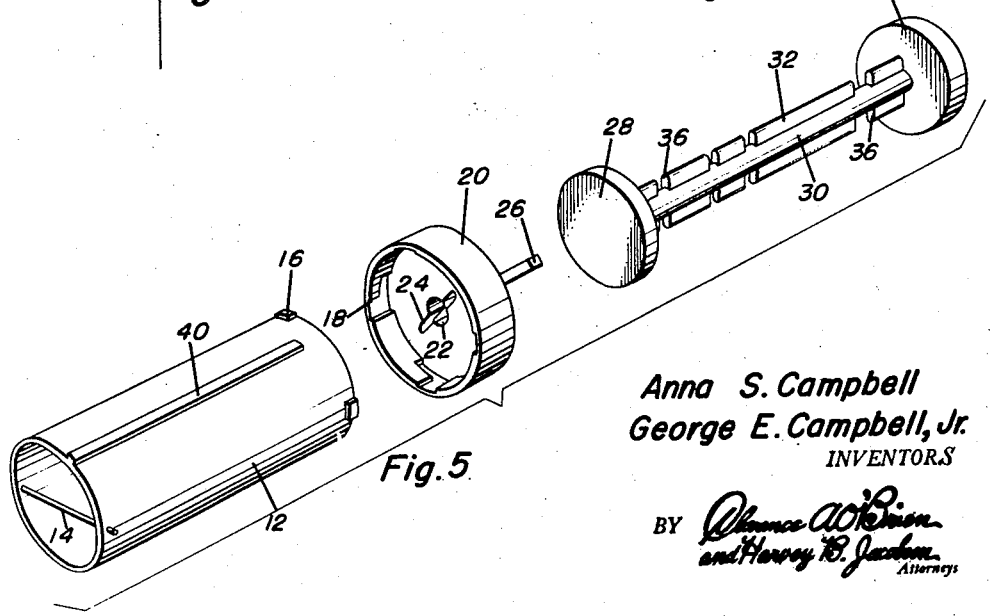
Anna S. Campbell
George E. Campbell, Jr.
INVENTORS United States Patent Office 2,701,912
Patented Feb. 15, 1955

2,701,912

EXTRACTING MEASURING DEVICE

Anna S. Campbell and George E. Campbell, Jr., McKeesport, Pa.

Application December 1, 1953, Serial No. 395,495

1 Claim. (Cl. 31—11)

This invention relates to an extracting measuring device which is specifically useful for extracting an accurate measurement of a quantity of plastic material from a plastic mass, such as shortening employed in cooking or baking or other purposes wherein the elimination of various utensils such as cups and spoons is accomplished.

The primary object of this invention is to provide an extracting measuring device for use in extracting a measured quantity of shortening from a shortening container and discharging the measured quantity of material as desired.

Another object of this invention is to provide an extracting measuring device having means for breaking the vacuum created by the removal of a quantity of plastic material from a mass of plastic material and novel improvements in the measuring of the quantity.

Yet another object of this invention is to provide an extracting measuring device which is simple in construction, easy to operate and constructed of relatively inexpensive material thereby lending itself to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the extracting measuring device of this invention;

Figure 2 is a top plan view of the construction of Figure 1;

Figure 3 is a longitudinal, vertical section taken substantially along section line 3—3 of Figure 1 showing the details of construction of the device of Figure 1;

Figure 4 is a transverse, top plan section taken substantially along section line 4—4 of Figure 3 showing the piston rod locking means; and Figure 5 is an exploded group perspective view showing the various elements of this invention in exploded relation.

Referring now specifically to the drawings, it will be seen that the numeral 10 generally designates the extracting measuring device of this invention which may be used for extracting and measuring a quantity of plastic material, such as shortening or the like.

The extracting measuring device 10 includes a tubular sleeve 12 having open ends with a wire member 14 extending across one end which is normally the lower end of the tubular member 12. The upper end of the tubular member 12 is provided with transversely projecting lugs 16 which are receivable in bayonet slots 18 in a cap member 20. The cap 20 is provided with a centrally located aperture 22 having oppositely extending slots 24 communicating with the opening 22. The upper surface of the cap member 20 is provided with oppositely disposed and oppositely projecting finger gripping members 26 wherein the cap member 20 and the tubular member or sleeve 12 may be easily supported and manipulated. A piston 28 is slidably positioned in the tubular sleeve 12 and is manipulated by a piston rod 30 having a pair of projecting ribs 32 along opposite longitudinal sides. The upper end of the piston rod 30 is provided with a suitable circular handle member 34 wherein the rod 30 may be moved through the opening 22 in the cap 20. A plurality of relieved portions 36 are disposed in the longitudinal ribs 32 in vertically spaced relation, and the uppermost of the relieved portions 36 is substantially twice the thickness of the lowermost of the relieved portions 36. The upper surface of the cap 20 adjacent the aperture 22 is provided with a countersunk arcuate groove 38 thereon which may have a cammed bottom surface wherein the relieved portions 36 may be positioned and held in adjusted relation to the cap 20. The upper relieved portion 36 is of such a width so as to completely bridge the cap 20 wherein the piston and rod 30 may be rotated when the piston 28 is in its lowermost position and the upper relieved portion 36 is in engagement with the cap 20. The lowermost relieved portions 36 are of such a thickness to ride in the groove 38 and the camming effect will hold the piston rod 30 and the piston 28 in vertically adjusted position in relation to the tubular sleeve 12. It will be seen that the aperture 22 and the slots 24 closely receive the piston rod 30 and the longitudinal ribs 32 and the particular arrangement of the relieved portions 36 provides means wherein the piston 28 may be locked in vertically adjusted position in non-rotative relation to the sleeve 12 and may be completely rotated in relation to the sleeve 12 when the piston 28 is in its lowermost position wherein the material carried by the sleeve member 12 has been discharged. As shown in Figure 5, the external surface of the tubular sleeve 12 is provided with a longitudinal rib 40 for a purpose described hereinafter.

The operation of the device will be readily understood. The cap 20 and the piston 28 and the rod 30 are constructed in assembled relation and the cap 20 may be easily placed on the tubular sleeve 12 by positioning the bayonet slots over the lugs 16 and twisting the cap 20 in an obvious manner, wherein the lugs 16 and the bayonet slots 18 are interlocked. When it is desired to remove a certain quantity of shortening from the shortening container, the piston 28 is retracted in an obvious manner, and by positioning the lowermost relieved portion 36 on the aperture 22 in the cap 20, the tubular sleeve 12 may be inserted into the shortening. The air which was displaced by the shortening entering the tubular sleeve 12 may escape around the piston and the piston rod in an obvious manner. When it is desired to remove the tubular sleeve 12, the finger gripping portions 26 are gripped and the device may be rotated or the handle member 34 on the piston rod 30 may be rotated wherein the wire member 14 separates the material contained in the sleeve from the material remaining in the container. It will also be understood that the longitudinal rib 40 on the outer surface of the tubular sleeve 12 breaks the vacuum created when the tubular sleeve 12 is removed from the shortening in the container. When it is desired to discharge the shortening in the sleeve 12, the handle 34 is rotated to bring the ribs 32 in alignment with the slots 24 wherein the piston 28 may be moved toward the lower end of the sleeve 12. When the piston 28 reaches its lowermost position, the uppermost relieved portion 36 is in engagement with the cap 20 wherein the piston 28 may be rotated, thereby completely separating the shortening from the piston 28. In the specific embodiment as illustrated, the capacity of the tubular sleeve 12 is one-half a cup, with the lowermost relieved portion 36 in engagement with the cap 20. The intermediate relieved portions 36 may be engaged with the cap 20 when it is desired to extract and measure one-third of a cup or one-quarter of a cup, as desired. Obviously, other quantities and sizes may be constructed as meets the individual requirements. It will be understood that all of the elements of this invention may be constructed of readily obtainable material, such as plastic or the like. Although the particular material of which this device is constructed is optional, it may be constructed of material having a pleasing appearance and which is easily cleaned and maintained in a sanitary condition. The device of this invention is especially useful in removing shortening of any type from a container, thereby eliminating the use of various spoons and cups which has been the practice heretofore. The particular use of this device is not limited to shortening, but may be used wherever a measured quantity of plastic material is desired to be extracted from a plastic mass having a consistency somewhat similar to shortening.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, fallling within the scope of the appended claim.

What is claimed as new is as follows:

An extracting and measuring device comprising a tubular sleeve having open ends, a removable cap positioned on one end of said sleeve, an aperture in said cap, a rod slidable in said aperture, a piston on said rod being slidably received in said sleeve, a slot in said cap intersecting said aperture, said rod having a longitudinal rib received in said slot, said rib being interrupted by a plurality of vertically spaced relieved portions wherein said rod may be angularly rotated when said relieved portions are aligned with the edges of said cap at said slot, said cap and said sleeve having interlocking means, said cap having hook members on the upper surface thereof that are disposed on opposite sides of said rod, a longitudinal rib disposed on the outer surface of said sleeve, and a transverse wire member extending across said sleeve remote from said cap for severing the material to be measured and extracted.

References Cited in the file of this patent

UNITED STATES PATENTS

| | | |
|---|---|---|
| 142,207 | Colbrunn | Aug. 26, 1873 |
| 447,286 | Bailey et al. | Mar. 3, 1891 |
| 740,608 | Valerius | Oct. 6, 1903 |
| 939,198 | Allen | Nov. 9, 1909 |
| 1,661,734 | Pearce | Mar. 6, 1928 |
| 1,908,813 | Blaho | May 16, 1933 |
| 2,559,328 | Thomas | July 3, 1951 |
| 2,603,867 | Guilder | July 22, 1952 |